July 17, 1928.
W. F. VAN CLEAVE
FUSELAGE FOR AEROPLANES
Filed March 7, 1927
1,677,535
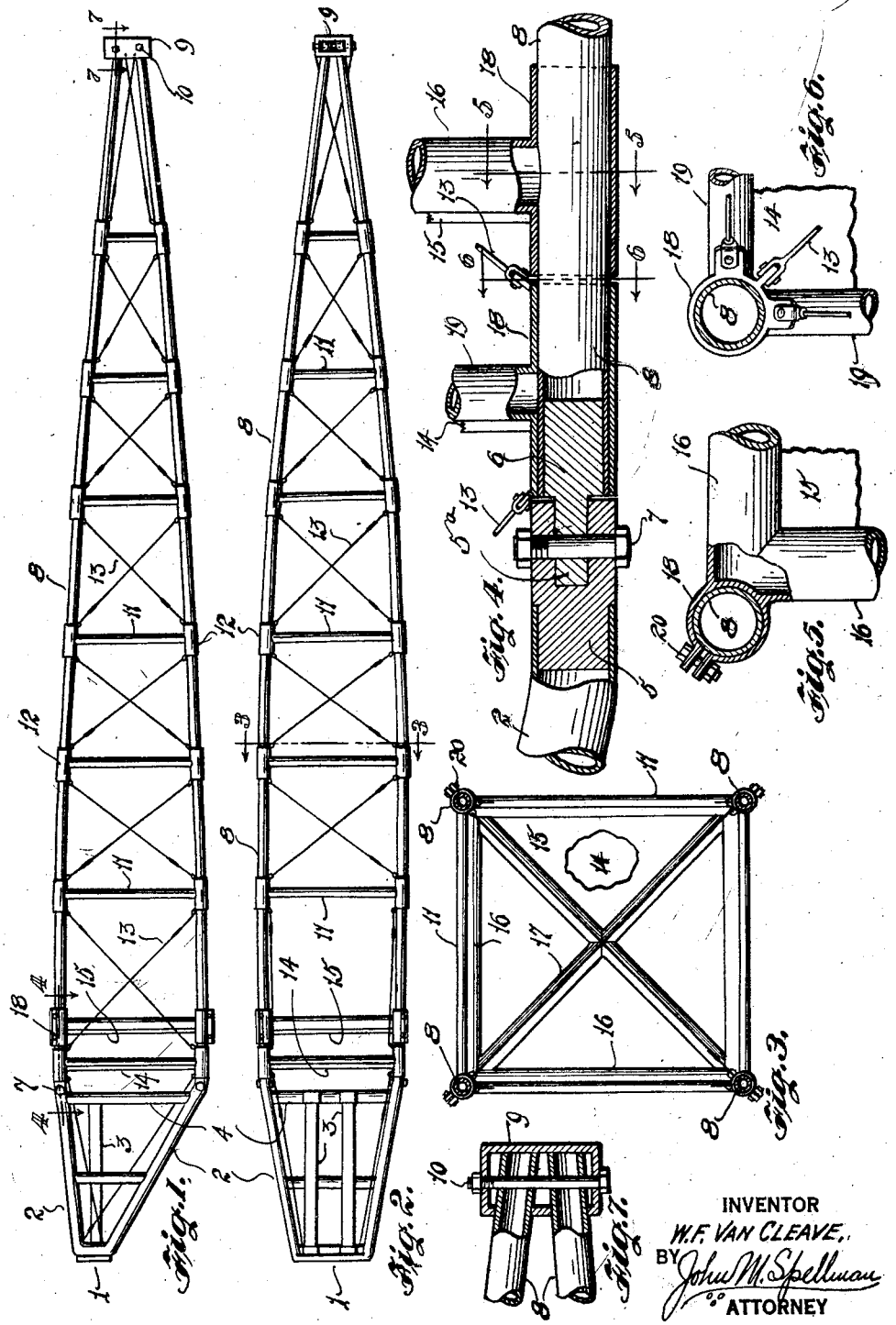
INVENTOR
W. F. VAN CLEAVE,
BY John M. Spellman
ATTORNEY Patented July 17, 1928.

1,677,535

UNITED STATES PATENT OFFICE.

WILLIAM F. VAN CLEAVE, OF DALLAS, TEXAS, ASSIGNOR OF ONE-HALF TO RICHARD M. BARNHART, OF DALLAS, TEXAS.

FUSELAGE FOR AEROPLANES.

Application filed March 7, 1927. Serial No. 173,276.

This invention relates to improvements in fuselages for aeroplanes and flying machines and the principal object thereof is to provide a floating longéron in the fuselage so arranged and constructed that the longéron rods that form the principal part of the fuselage may be removed when damaged or for other reasons and new rods placed in the fuselage frame without the necessity as at present of taking down the fuselage or removing the cover therefrom.

Another object of the invention is the provision of a double fire panel between the engine of the machine and the other parts thereof.

With the above objects in view, the invention will be clearly understood from a perusal of the following detailed description, taken in connection with the accompanying drawings forming part thereof, and in which:

Figure 1 is a side elevational view of an aeroplane fuselage with cover removed and embodying the invention.

Figure 2 is a top or plan view thereof.

Figure 3 is a cross sectional view taken along the line 3—3 of Figure 2.

Figure 4 is a partial longitudinal sectional view along the line 4—4 of Figure 1, and Figures 5 and 6 are cross sectional views, respectively, along the lines 5—5 and 6—6 of Figure 4.

Figure 7 is a detailed end view, partly sectioned.

Proceeding in accordance with the drawings and wherein similar numerals designate the various parts of the invention, 1 denotes the engine frame or carriage formed of the hollow steel rods 2 and wherein are illustrated horizontal engine supports 3 with brace rods 4. As shown in Figure 4 the rods 2 are passed over and enclose one end of a lug 5 to which the hollow end of the rods 2 are welded or otherwise securely fastened. The outer end of the lug 5 is forked providing a recess for the insertion and reception of the tongue 5ª of a similar lug 6 which lug is inserted and is also tightly secured by welding or otherwise to the end of the hollow rods 8 forming the longéron or main part of the fuselage. Both lugs 5 and 6 are perforated for the reception of a bolt or bolts 7 which hold the parts together. The rods 8 extend in spaced-apart and converging direction in one continuous piece from the lug 6 and are connected to a member 9 by means of the bolts 10.

The rods 8 are spaced apart by the struts 11. In the drawing the struts are shown formed integrally with the sleeves 12, but the invention is not to be understood as restricted to this form, as the struts or strut rods may be separable from the sleeves and held thereon by a rounded projection or recess over or into which the hollow end of the strut rod may be received or supported, or any other preferred means in the range of equivalents. These sleeves 12 are provided with perforations, rings, or the like for fastening thereto the guy wires 13 which form the means for holding the longérons and strut rods together.

One of the features of the invention is a protection by way of a double fire panel between the engine and the other part of the machine. One of these panels is indicated at 14, nearest the engine carriage, and the other panel shown at 15, both panels spaced apart. The panels are held in place by frames, the panel 15 including a frame formed by the rods 16 and the diagonally disposed rods 17. These rods also include the sleeves 18 through which the longéron rods 8 are passed. The panel 14 includes a frame composed of the rods 19 and the sleeves 18. The sleeves 18 are provided with bolts 20 which hold the sleeves rigid upon the ends of the longéron rods.

From the foregoing it will now be apparent that any one or all of the longéron rods may be quickly removed and a new rod substituted by removing the bolts 7, loosening the bolts 20 upon the inner ends of the sleeve 18 holding the inner ends of the longéron rods and removing the bolts 10, including the displacement of the member 9.

What I claim is:

A fuselage for flying machines comprising an engine frame, a plurality of steel rods forming longéron rods spaced apart and including strut rods with sleeve portions and guy wires for holding said longéron rods in rigid spaced relation; each of said longéron rods removably connected to said engine frame and capable of being removed without disarranging or taking down the covering or other parts of said fuselage in renewing or replacing broken or damaged longéron rods.

In testimony whereof I affix my signature.

WILLIAM F. VAN CLEAVE.